C. S. EPPLEY.
MOTOR DRIVEN MECHANISM FOR SELF ACTING SWITCHES.
APPLICATION FILED DEC. 28, 1917.
1,291,451.
Patented Jan. 14, 1919.
3 SHEETS—SHEET 3.
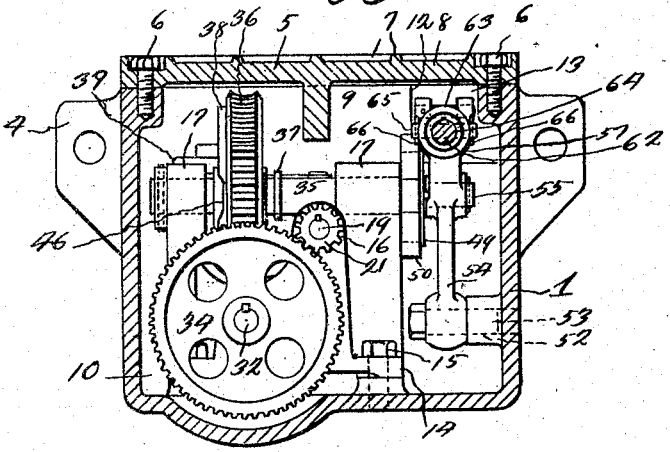

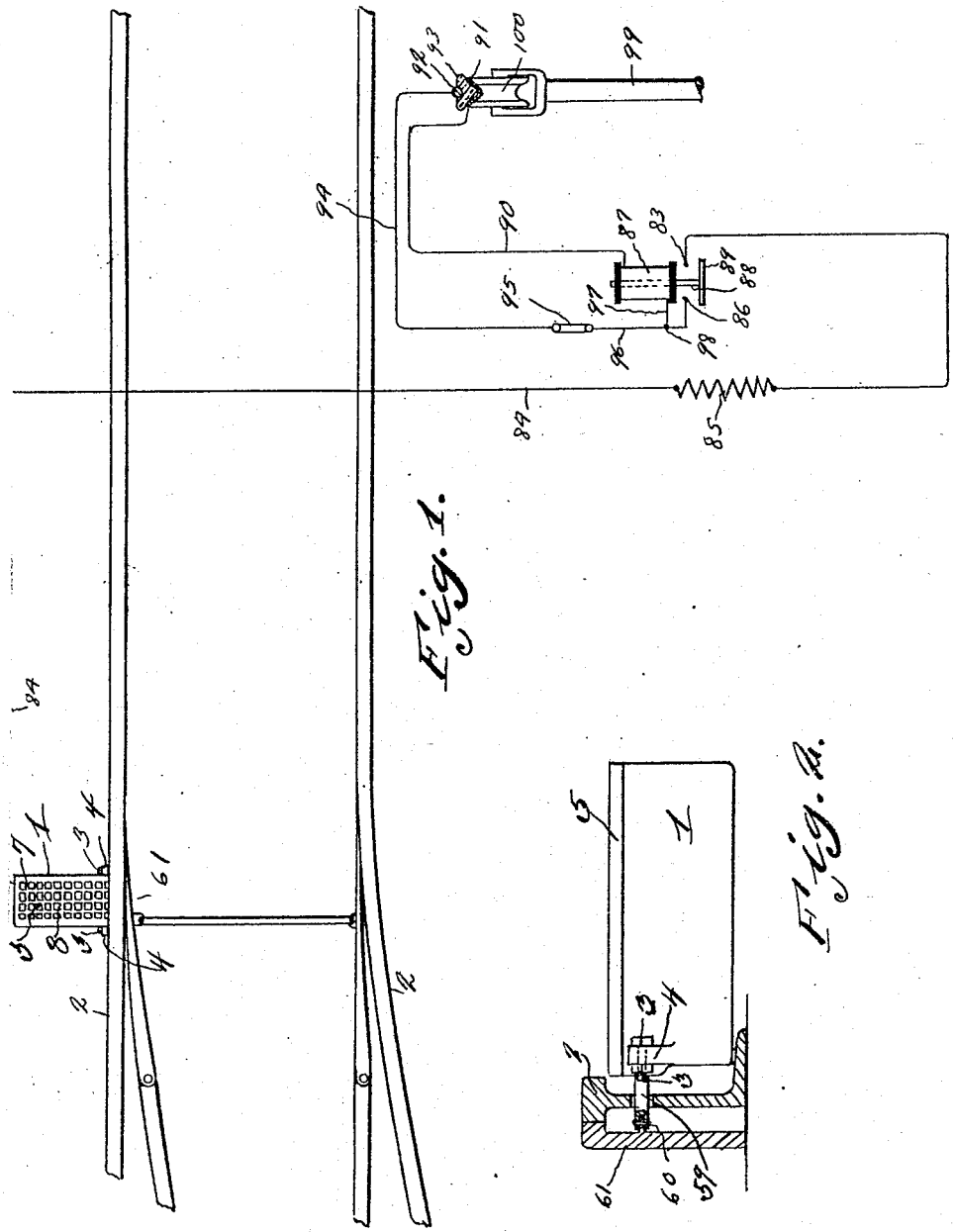
C. S. EPPLEY.
MOTOR DRIVEN MECHANISM FOR SELF ACTING SWITCHES.
APPLICATION FILED DEC. 28, 1917.
1,291,451. Patented Jan. 14, 1919.
3 SHEETS—SHEET 1.

UNITED STATES PATENT OFFICE.

CHARLES S. EPPLEY, OF YORK, PENNSYLVANIA, ASSIGNOR TO SELF ACTING SWITCH CO., OF YORK, PENNSYLVANIA, A CORPORATION.

MOTOR-DRIVEN MECHANISM FOR SELF-ACTING SWITCHES.

1,291,451. Specification of Letters Patent. Patented Jan. 14, 1919.

Application filed December 28, 1917. Serial No. 209,288.

*To all whom it may concern:*

Be it known that I, CHARLES S. EPPLEY, a citizen of the United States, residing at York, in the county of York, State of Pennsylvania, have invented a new and useful Motor-Driven Mechanism for Self-Acting Switches; and I do hereby declare the following to be a full, clear, and exact description of the invention, such as will enable others skilled in the art to which it appertains to make and use the same.

This invention relates to an improved motor driven mechanism for self acting switches, and one of the objects of the invention is to provide a mechanism of this kind that is strictly positive in its action and is automatically controlled by the motorman when operating the controlling handle of the control box.

A further object of the invention is to improve, simplify, and render more practical and positive the switch operating mechanism specified, illustrated and claimed in the patent issued November 14, 1916 to C. S. Eppley, Patent No. 1,205,134.

A further object of the invention is to provide a motor driven mechanism of this kind which is adapted to be installed in circuit with the electrical energy of the car and its source of supply, whereby, as the motorman operates or manipulates the controller handle, said mechanism is put in action, which in turn automatically throws the switch.

During the installation of the mechanism of the aforesaid patent, it was found that the switch point was too quick in its action when thrown, in which case the slush or water surrounding the switch point during bad weather would be thrown or splashed, which is obnoxious to the foot, and particularly objectional owing to splashing the wearing apparel of pedestrians, particularly ladies' dresses.

A further object of the invention is to provide a motor driven mechanism of this kind having improved means connecting the motor of said mechanism and the switch point, whereby the ultimate power derived from the quick operating motor is reduced in speed or action, so as to eliminate the quick operation of the switch point, and consequently overcome the splashing of the slush.

A further object of the invention is the provision of a motor driven mechanism having reducing gear connections, which in turn has an eccentric connection with yieldable means of a switch actuating rod, for throwing the switch point.

A further object of the invention is the provision of means for automatically uncoupling the motor driven shaft of the mechanism from the shaft of the reducing gear connections subsequently to throwing the switch point.

In practical fields the details of construction may necessitate alterations falling within the scope of what is claimed.

The invention comprises further features and combination of parts as hereinafter set forth shown in the drawings and claimed.

In the drawings:—

Figure 1 is a diagrammatic view showing the application of the motor driven switch mechanism in circuit with the electrical energy of the car.

Fig. 2 is a detail sectional view of one of the rails and the switch point in section, and showing the casing of the mechanism, (which is connected to the switch point) in elevation.

Fig. 5 is a sectional view on line 5—5 of Fig. 3.

Fig. 6 is a sectional view on line 6—6 of Fig. 3.

Figure 3:
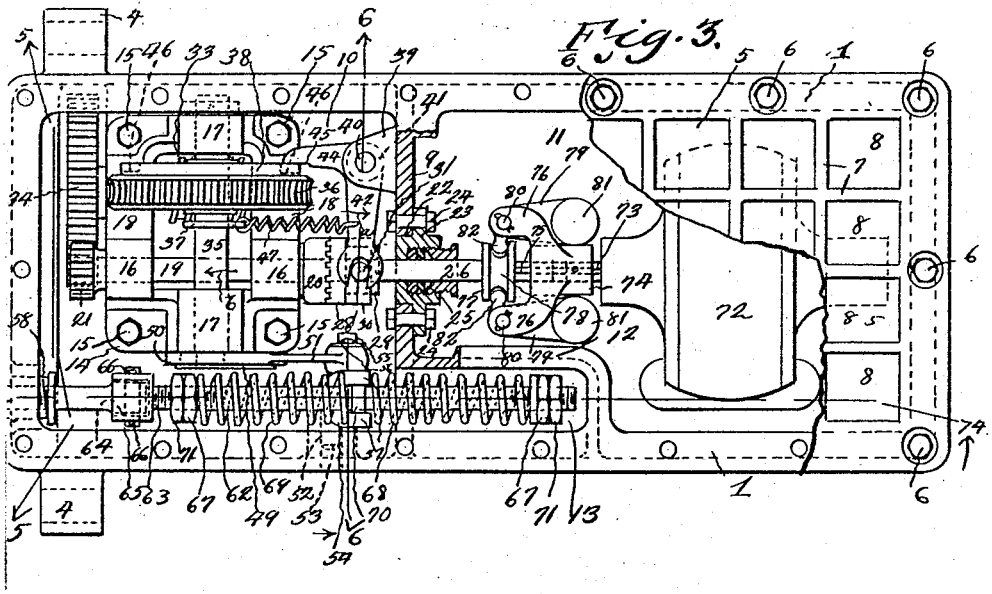
Fig. 3 is an enlarged plan view of the mechanism showing the top plate of the casing broken away, and various parts of the mechanism in elevation and parts in section.
Figure 4:
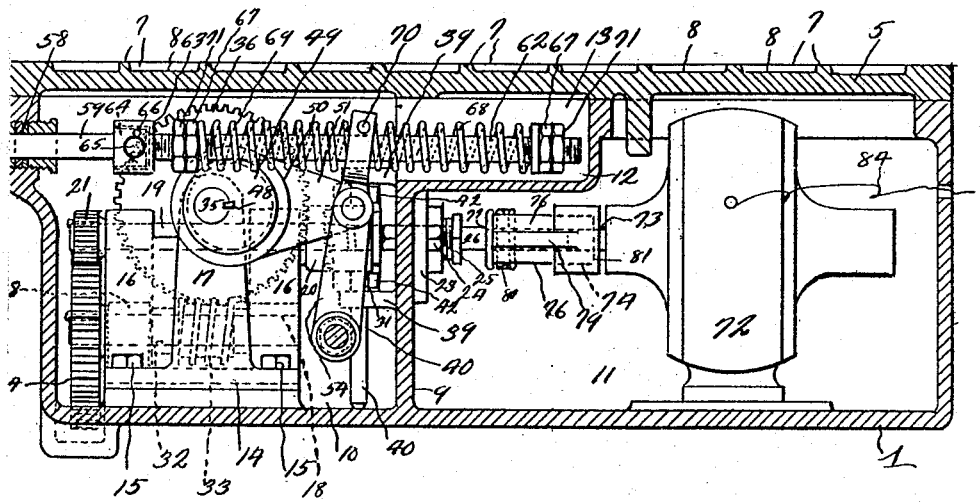
Fig. 4 is a sectional view on line 4—4 of Fig. 3.

Referring more especially to the drawings 1 designates a casing, which may be any suitable shape or configuration, and which may be fastened in any suitable manner to the side of one of the rails 2, preferably by means of bolts 3, which pass through the ears 4 of the sides of the casing and through the rail. The casing where it is installed adjacent the rail may be embedded in the ground or the concrete, whereby the cover plate 5 (which is secured to the upper marginal edge of the casing by the bolts 6) is flush with the upper surface of the ground or concrete. This cover plate is provided with the usual transverse and longitudinal ribs 7 and cavities 8, in order to avoid a smooth upper surface, which would be slippery during bad weather. This casing is provided with a partition wall 9, which divides the casing in two compartments 10 and 11. The wall 9 merges into an extension wall 12, which is of the general shape as shown, which consequently causes to be formed or constructed an elongated pocket 13, for the purpose to appear as the specification proceeds. A suitable plate 14 is secured by bolts 15 to the bottom of the compartment 10, and rising upwardly from this plate are bearings 16, 17 and 18. Mounted in the bearings 16 is a shaft 19 provided with a gear clutch 20 rigidly fixed at one end. On its other end a pinion 21 is fixed. The partition or wall 9 has an opening 22, in which a portion of a plate 23 extends. This plate is secured by bolts 24 to the wall 9, and is provided with a packing gland or box 25. Mounted in the packing gland or box is a shaft 26, which is alined axially with the shaft 19. A gear clutch collar is keyed by means of a pin 27 to one end of the shaft 26, so as to rotate therewith, or move with said shaft 26 when it is operated axially. This gear clutch collar 28 is designed to mesh with the teeth of the gear clutch 20, so that the two shafts 19 and 26 may rotate together axially. This gear clutch collar 28 has a reduced part 29, surrounding which is a loosely fitting collar 30, which is provided with diametrically oppositely disposed pins 31. Mounted in the bearings 18 is a shaft 32, on which a worm 33 is keyed, and on which shaft at one end a spur gear 34 is keyed. This spur gear 34 meshes with the pinion 21. A shaft 35 is journaled in the bearings 17, and fixed to and rotatable with the shaft 35 is a worm wheel 36, with which the worm 33 meshes. A collar 37 is loosely mounted on the shaft 35, and one face of the worm wheel has an enlargement 38 which is circular. Projecting inwardly from the wall 9 is a pair of spaced ears 39, in which a pin 40 is mounted. Rockably mounted upon the pin 40 is a sleeve 41, and projecting radially from the sleeve at both ends are arms 42, the extremities of which are forked, to loosely engage the pins or lugs 31 of the collar 30, so that when the sleeve 41 is rocked in one direction, the gear clutch collar 28 and its shaft 26 may be moved axially. An arm 44 projects from the sleeve 41 in a direction at right angles to the arms 42. One edge of the arm 44 at its end is notched as shown at 45, and which notched end overlies the face of the circular enlargement 38. The enlargement 38 has a notch 46. A spring 47 connects the collar 37 and one of the arms 42. When the shaft 26 is moved axially by means to be hereinafter set forth, which is accomplished at the time the notch 46 registers with the end of the arm 44, said arms 42 are moved in the direction of the arrow $a$ against the action of the spring 47, consequently causing the end of the arm 44 to engage the notch 46, which will hold the worm wheel and its shaft against further rotation. Keyed by means of a feather key 48 to one end of the shaft 35 is an eccentric 49, which is provided with an eccentric ring 50. This ring 50 has a radially extending arm 51. The inner face of one of the side walls of the casing 1 has a threaded opening 52, in which a bolt 53 is threaded. A lever 54 is fulcrumed upon the bolt 53, and is in turn, by means of a pin 55, pivotally connected to the end of the arm 51 of the eccentric ring, there being cotter pins 56 to prevent axial movement of the pivot pin 55. The lever 54 has a forked extension 57. The end wall of the compartment 10 of the casing 1 has a packing gland or box 58, in which a rod 59 is guided. This rod 59 is in turn connected at 60 to one of the switch points 61. A rod 62 is provided and has its end portions threaded. One end of the rod 62 has an enlargement 63 which is hollow, and it loosely fits over an enlargement 64 of the inner end of the rod 59, there being a pivot pin 65 (which loosely fits bearings of the two enlargements) for connecting the enlargements together. Cotter pins 66 are provided in the ends of the pin 65 to prevent the same from moving axially. Engaging the threaded ends of the rod 62 are nuts 67, and surrounding the rod and intermediate the nuts 67 are coil springs 68 and 69. The forked extension 57 of the lever 54 straddles the rod 62 intermediate the adjacent ends of said springs 68 and 69. A pin 70 engages the forks of the extension 57, to prevent excessive displacement of the rod 62. By adjusting the nuts 67 the tension of the springs 68 and 69 may be increased or decreased, there being lock nuts 71 on the rod 62 to lock the nuts 67 after they have been once adjusted. When the shaft 35 is rotated in the direction of the arrow $b$ very slowly (which is accomplished owing to the reduced gear connections with the shaft 26, which is rapidly rotated), the eccentric 49 is operated, which imparts movement to the lever 54 through the medium of the radial arm 51 of the eccentric ring 50. The oscillating of the lever 54 in turn imparts movement to the rods 59 and 62 owing to the yieldable connections, which is turn will operate the switch point. A suitable electric motor 72 has its base mounted on the bottom of the compartment 11, and keyed to the shaft of this motor as shown at 73 is a body member 74. The bore of this body member 74 axially and telescopically receives one end of the shaft 26. This shaft 26, by means of the feather key 75 is keyed to rotate with but telescopically slide into the body member 74. The body member is provided with diametrically oppositely disposed arms 76 arranged in pairs, the arms of each pair being spaced. A collar 77 is formed integral with the shaft 26 and is provided with an annular groove 78 semicircular in cross section. The arms 76 of each pair overlie the collar 77. Bell crank members 79 are pivotally mounted by means of pins 80 in the pairs of arms 76 respectively. One arm of each bell crank member 79 terminates in a weight 81, while the other arm is formed into a spherical knub 82. These knubs 82 engage the annular groove 78 of the collar 77. When electrical energy from any suitable source is furnished the motor 72, its shaft is rotated, and through centrifugal force, the weighted bell crank members are thrown outwardly on their pivots, and by the rocking movement of the bell crank members, since their knubs 82 engage the groove of the collar 77, the shaft 26 is given an axial movement, which will disengage the gear clutch collar from the gear clutch 20. As a result of sufficient revolutions of the motor shaft, these above operations occur instantly as the notch 46 registers with the end of the arm 44, at which time the switch point is completely thrown. When the motor is deënergized, the spring 47 actuates the arms 42 to restore the shaft 26 again in clutch with the shaft 19. When the motor is again operated the foregoing operations repeat themselves, and as either one of the notches 46 reach the end of the arm 44, the notch assumes a position, whereby one of its ends is right adjacent the end of the arm 44, subsequently to it having entered the notch, so that when pressure is exerted on said arms 42 and 44 by the centrifugal action of the weighted bell crank members, the extremity of the arm 44 will not enter the notch, but will engage the face of the enlargement 38 immediate adjacent one end of the notch. However, the flanges of the car wheels may throw the switch point when the car is moving in one direction, owing to the yieldable connection between the rod 62 and said lever 54. The motor 72 is in circuit with a contact 83, by means of the wire 84, there being a resistance coil 85 located in the wire or lead 84. A second contact 86 is opposed to the contact 83. A solenoid or magnet 87 is provided, and its core 88 is provided with an armature 89. By means of a wire 90 the magnet or solenoid is electrically connected to a contact plate 91. This contact plate is somewhat elongated and is insulated from the trolley wire 92 by means of the insulation 93. The trolley wire 92 is connected by means of a wire 94 to a switch 95, which is in turn connected by a wire or lead 96 to the contact 86. A wire 97 forms a junction 98 with the wire 96 and is in turn connected to the magnet. For illustrative purposes a portion of the trolley pole 99 and its trolley wheel 100 is shown in Fig. 1. The cover is held closely in place on the casing and owing to the packing glands or boxes, the lubricant (which is in the compartment 10 for keeping the operating parts well lubricated) cannot escape. As the trolley car approaches the switch and the controller handle or switch 95 of the controller box is operated to close the circuit of the electrical energy of the car, the trolley wheel rises under the contact plate 91. Current then leaves the power house or other source of supply (not shown) over the trolley wire 92 to the controller handle or switch 95 through the electric magnet 87 (which energizes and attracts the armature 89) and to the contact plate 91. The current passes over the trolley wheel 100 through the trolley pole to the motor of the car and back to the source of supply over one of the rails. The energizing of solenoid and attraction of the armature 89 causes a connection to be made between the contacts 83 and 86. The current then flows from the source of supply (not shown) over the trolley wire 92 to the junction 98 across contact 86 and 83 over the wire to the resistance 85 over the wire 84 to the motor of the track switch thereby operating or throwing said track switch. The current then passes from the switch motor 72 (which is electrically connected to the rail) through the rail and thence back to the source of supply.

The invention having been set forth what is claimed as new and useful is:—

1. In a motor driven mechanism for switches, a revoluble driving member, a switch point, a revoluble driven element, reducing gear connections between the element and the switch point, means for connecting the member to the element, whereby the latter is driven by the former and including a link for preventing the connecting means from being prematurely severed, and means for automatically actuating the member for a period of comparatively short duration for throwing the switch point.

2. In a mechanism for throwing switches, a revoluble driving member, a switch point, a revoluble driven element, gear connections between the switch point and the element, means connecting the member and the element, whereby the latter is driven by the former, and including a link preventing said connecting means from being prematurely severed, means for severing said connecting means, and electrical means in circuit with the electrical energy of the car for a period of comparatively short duration for temporarily actuating the member.

3. In a mechanism for throwing switches, a revoluble driving member, a switch point, a revoluble driven element, gear connections between the switch point and the element, means connecting the member and the element, whereby the latter is driven by the former, means for severing said connecting means, and electrical means in circuit with the electrical energy of the car for a period of comparatively short duration for temporarily actuating the member, whereby the switch point is thrown, and means forming a link in said gear connections for rendering the connecting means between the member and the element positive for a certain period, said last named means including means whereby the last named means is impositive at alternate periods, whereby the severing means may sever said connecting means between the member and the element.

4. In a mechanism for throwing switches, a switch point, a revoluble driven element connected thereto, a driving member, means axially connecting the member and the element, whereby the latter is driven through the medium of the former, and including a link preventing said connecting means from being prematurely severed, means for severing said axially connecting means, and means automatically actuated for a period of comparatively short duration for temporarily actuating the member for throwing the switch point.

5. In a mechanism for throwing switches, a switch point, a revoluble driven element having reducing gear connections with the switch point, a driving member, means coupling the member and the element, whereby the latter is driven through the medium of the former, means automatically actuated for a period of comparatively short duration for temporarily actuating the member for throwing the switch point, a device for severing the coupling means, and means forming a link in said gear connections for actuating said device to uncouple the member and the element.

6. In a mechanism for throwing switches, a switch point, a revoluble driven element having reducing gear connections therewith, a driving member, means coupling the member and the element, whereby the latter is driven by the former, and means for actuating the coupling means for severing said coupling means, whereby said member is uncoupled from the element subsequently to throwing the switch, a tensioned device for holding said member and the element detachably coupled, and means coöperating with the tensioned device to prevent the coupling means from being prematurely severed.

7. In a mechanism for throwing switches, a switch point, a revoluble driven element, gear connections and yieldable means connecting the element and said switch point, a driving member, means detachably coupling the member and the element, whereby the latter is driven by the former, means for severing said coupling means, a tension device for holding said member and the element detachably coupled, and means coöperating with the tension device to prevent the coupling means from being prematurely severed.

8. In a mechanism for throwing switches, a revoluble driven element, a driving member alined axially therewith, means detachably coupling the member and the element, whereby the latter may be driven by the former, a switch point, gear connections connecting the switch point and the element, a device for severing the coupling connections, and means forming a link in said connections for actuating said device.

9. In a mechanism for throwing switches, a revoluble driven element, a driving member alined axially therewith, means detachably coupling the member and the element, whereby the latter may be driven by the former, a switch point, gear connections between the switch point and the element, a device, spring means tensioning said device, a holding member forming a link in said connections, said holding member together with the tension of the spring means acting to hold the coupling means positively connected, said holding member having means to permit the device to be actuated against the action of the spring means.

10. In a mechanism for throwing switches, a revoluble driven element, a driving member alined axially therewith, means detachably coupling the member and the element, whereby the latter may be driven by the former, a switch point, gear connections between the switch point and the element, a device, spring means tensioning said device, a holding member forming a link in said connections and having diametrically opposite notches to permit the device to enter thereinto when actuated against the action of the spring means, and means on said driving member actuated by centrifugal force for moving the member axially and tilting said device whereby it may engage one of said notches.

11. In a motor driven mechanism for switches, a switch point, a driven element, a lever having connections with the switch point, gear means operated by the driven element, said gear means having an eccentric and strap connection with the lever, a motor, a revoluble driving member connected to and driven by the shaft of the motor, means detachably coupling the member and the element whereby the latter is driven by the former for operating the gear means and throwing the switch point, means for severing said coupling means, said coupling means including a link and a coöperative element for preventing the coupling means from being prematurely severed.

12. In a motor driven mechanism for switches, a switch point, a driven element, a lever having connections with the switch point, gear means operated by the driven element, said gear means having an eccentric and strap connection with the lever, a motor, a revoluble driving member connected to and driven by the shaft of the motor, means detachably coupling the member and the element whereby the latter is driven by the former for operating the gear means and throwing the switch point, said revoluble driving member being axially movable, and means carried by and operative with the motor shaft and having connections with the driving member to move it axially to sever the coupling means subsequently to throwing the switch point.

13. In a motor driven mechanism for switches, a switch point, a driven element, a lever having connections with the switch point, gear means operated by the driven element, said gear means having an eccentric and strap connection with the lever, a motor, a revoluble driving member connected to and driven by the shaft of the motor, means detachably coupling the member and the element whereby the latter is driven by the former for operating the gear means and throwing the switch point, said driving member being axially movable, a tensioned device for holding the driving member coupled to the driven member, and means carried by and operative with the motor shaft and having connections with the driving member and actuated through centrifugal force to sever the coupling means against the action of the tension device subsequently to throwing the switch point.

14. In a motor driven mechanism for switches, a switch point, a driven element, a lever having connections with the switch point, gear means operated by the driven element, said gear means having an eccentric and strap connection with the lever, a motor, a revoluble driving member connected to and driven by the shaft of the motor, means detachably coupling the member and the element whereby the latter is driven by the former for operating the gear means and throwing the switch point, said driving member being axially movable, a tensioned device for holding the driving member coupled to the driven member, and means carried by and operative with the motor shaft and having connections with the driving member and actuated through centrifugal force to sever the coupling means against the action of the tension device subsequently to throwing the switch point, and a revoluble holding member forming a link in said gear means and operative in the path of the tensioned device, said holding member having a pair of notches, either one of which is adapted to register with a part of said tensioned device at the time the switch point will have been completely thrown, whereby said coupling means may be severed.

15. In a motor driven mechanism for switches, a switch point, a driven element, a lever having connections with the switch point, gear means operated by the driven element, said gear means having an eccentric and strap connection with the lever, a motor, a revoluble driving member connected to and driven by the shaft of the motor, means detachably coupling the member and the element whereby the latter is driven by the former for operating the gear means and throwing the switch point, said driving member being axially movable, a tensioned device for holding the driving member coupled to the driven element, and means carried by and operative with the motor shaft and having connections with the driving member and actuated through centrifugal force to sever the coupling means against the action of the tension device subsequently to throwing the switch point, and a revoluble holding member forming a link in said gear means and operative in the path of the tension device, said holding member having a pair of notches, either one of which is adapted to register with a part of said tension device at the time the switch point will have been completely thrown, whereby said coupling means may be severed, and electrical means in circuit with the motor and the electrical energy of a car for operating the motor for a period of comparatively short duration for temporarily actuating said driving member.

16. In a motor driven mechanism for switches, a switch point, a driven element, a lever having yieldable connections with the switch point, reducing gear means between and connecting the element and the lever, a revoluble and axially movable driving member, means detachably coupling the member and the element, whereby the latter is driven by the former, an electric motor, means coupling the shaft of the motor and the driving member and provided with centrifugally actuated devices loosely connected to the driving member for axially moving the same for severing said first coupling means subsequently to throwing the switch.

17. In a motor driven mechanism for switches, a switch point, a driven element, a lever having yieldable connections with the switch point, reducing gear means between and connecting the element and the lever, a revoluble and axially movable driving member, means detachably coupling the member and the element, whereby the latter is driven by the former, an electric motor, means coupling the shaft of the motor and the driving member and provided with centrifugally actuated devices loosely connected to the driving member for axially moving the same for severing said first coupling means subsequently to throwing the switch, a tension device against the action of which said driving member is axially moved, a revoluble holding member forming a link in said gear means, said holding member having a pair of diametrically opposed notches, either one of which is adapted to register with a part of said device to allow it to be operated against its tensioning means, when the switch point has been completely thrown.

18. In a mechanism for throwing switches, a switch point, a revoluble driven element, means between and connecting the element and the point, a revoluble and axially movable member, means severably coupling the member and the element whereby the latter is driven by the former, and means carried by said member and being actuated centrifugally for moving the member axially whereby said coupling means may be severed.

19. In a mechanism for throwing switches, a switch point, a revoluble driven element, means between and connecting the element and the point, a revoluble and axially movable member, means severably coupling the member and the element whereby the latter is driven by the former, and means carried by said member and being actuated centrifugally for moving the member axially whereby said coupling means may be severed, and a spring tensioned device against the action of which said member is axially moved, and means to permit said device to be actuated.

20. In a mechanism for throwing switches, a switch point, a revoluble driven element, means between and connecting the element and the point, a revoluble and axially movable member, means severably coupling the member and the element, whereby the latter is driven by the former, a spring tensioned device for maintaining the coupling means positive, means carried by said member and having outwardly centrifugally operating devices connected to and moving said member axially, whereby said coupling means may be severed against the action of the tensioning device.

21. In a mechanism for throwing switches, a switch point, a revoluble driven element, means between and connecting the element and the point, a revoluble and axially movable member, means severably coupling the member and the element, whereby the latter is driven by the former, a spring tensioned device for maintaining the coupling means positive, means carried by said member and having outwardly centrifugally operating devices connected to and moving said member axially, whereby said coupling means may be severed against the action of the tensioning device, means to permit the spring tensioned device to be actuated, and an electric motor having its shaft coupled to the member by the means carrying said centrifugally operating devices, and being in circuit and operated by the electrical energy of a car for a period of comparatively short duration to operate the member correspondingly.

22. In a mechanism for throwing switches, a revoluble driven element, a driving member, means detachably coupling the member and the element, whereby the latter may be driven by the former, a switch point, connections between the switch point and the element, means carried by the driving member and being centrifugally actuated for severing said coupling means, a device, spring means tensioning said device, a holding member forming a link in said connections, said holding member together with the tension of the spring means acting to hold the coupling means positively connected for a comparatively short period of duration, said holding member having diametrically opposed notches to be alternately engaged by one end of said device to permit the centrifugally actuated severing means to sever the coupling means.

23. In a mechanism for throwing switches, a revoluble driving member, a switch point, a revoluble driven element, means connecting the member and the element whereby the latter is driven by the former, means for severing said connecting means, gear connections between the switch point and the element, and a mechanism forming a link in said gear connection for rendering the connecting means between the member and the element positive and impositive alternately, whereby upon the impositive connection, said connecting means may be severed by the severing means.

24. In a mechanism for throwing switches, a switch point, a revoluble driven element, gear connections and means connecting the element and the switch point, a driving member, means detachably coupling the member and the element, whereby the latter is driven by the former, a device for holding said member and the element detachably coupled, and means coöperating with the device to prevent premature separating of the coupling means.

In testimony whereof I have signed my name to this specification in the presence of two subscribing witnesses.

CHARLES S. EPPLEY.

Witnesses:
GEARY A. ILLIOS,
VIRGINIA B. WRIGHT.

Copies of this patent may be obtained for five cents each, by addressing the "Commissioner of Patents, Washington, D. C."